United States Patent Office 2,916,351
Patented Dec. 8, 1959

2,916,351

METAL HALIDE PRODUCTION

Virgil L. Hansley, Harry Greenberg, and Stuart Schott, Cincinnati, Ohio, assignors to National Distillers and Chemical Corporation, New York, N.Y., a corporation of Virginia No Drawing. Application November 15, 1957
Serial No. 696,635

9 Claims. (Cl. 23—87)

This invention relates to a new and improved method for the production of metal halides. More particularly, the invention pertains to a process for the direct halogenation of crude grade metal to obtain the corresponding metal halide substantially free of certain undesirable metal impurities.

Numerous uses have been developed recently for metal halides of good quality. In the manufacture of certain metals processes have been proposed which involve an initial halogenation step followed by treatment of the resulting metal halides with well known reducing agents. Although these processes yield high quality metal products, they require an elaborate halogenation step in order to avoid the hazards normally associated with direct halogenation. In addition, the metal halides must be subjected to extensive purification methods prior to reduction in order to obtain metal halides sufficiently free of metal contaminants to give high quality metal. In the preparation of zirconium metal, for example, zirconium tetrahalide has been produced by halogenating (1) zirconium carbonitride or carbide, (2) zircon in the presence of carbon and sugar, and (3) zirconium oxide in the presence of carbon tetrachloride or carbon. Following halogenation the zirconium tetrahalide is subjected to extensive purification procedures in order to remove deleterious metal halide impurities such as iron halide.

One object of this invention is the use of impure metals as feed material for the production of metal halides of high quality. Another object is a combined method for the direct halogenation of impure metals and purification of the metal halide products. Other objects and advantages of the invention will be apparent from the ensuing description.

In accordance with the present invention, it has now been found that direct halogenation of impure grade metal may be safely carried out in a commercially adaptable process by diluting the halogen gas with an inert gas such as argon, helium, or neon. Another important feature of this invention is the production of metal halides which have a markedly lower metallic impurity content than the starting material. The metal halide which may be effectively prepared by the inventive process are the halides of the group IVB and group VB heavy metals such as titanium, zirconium, hafnium, columbium and tantalum. The preferred metal halide products are zirconium halides, and the production of zirconium tetrachloride is especially preferred.

In general, the impure grade of metal which may be employed as the feed material in the present process may be any crude material containing the metal of the halide to be produced. Using zirconium as an example the crude feed material may be zirconium scrap, zirconium sponge and various zirconium alloys etc.

In a more specific embodiment of the invention zirconium scrap, i.e. zirconium in the form of fine turnings, is used as the impure metal feed material. It is known that zirconium scrap will chlorinate spontaneously at temperatures above 400° C. However, the reaction often leads to explosive conditions due to the highly exothermic nature of the reaction and the creation of glowing hot spots in the reaction zone. In addition, metal contaminants such as iron and tin which are present in the zirconium scrap are also chlorinated during the reaction and as a result contaminate the zirconium tetrachloride product. According to the instant invention a safe and commercially adaptable process has been discovered whereby the zirconium scrap can be chlorinated directly without the explosive conditions developing and whereby the content of the metal impurities in the zirconium tetra-chloride are considerably lower than in the impure material. The process comprises diluting the chlorine with an inert gas such as argon and passing it over a static bed of scrap at least three or four times longer than the hot reaction zone. The respective flow rates of the chlorine and argon gases may vary over a wide range. In general, however, the flow rate of the chlorine will be about 150 to 400 cc. per minute in a 1½" I.D. tube and the flow rate of the argon or other inert gas will be about 400 to 800 cc. per minute with inert gas to chlorine feed volume ratios of 2:1 to 10:1 being preferred. Other operating conditions include a chlorination temperature of about 450° to 900° C. and the use of atmospheric pressure.

It is a particularly important feature of this invention that no more than 90%, preferably about 50 to 80%, of the impure grade metal feed material be subjected to halogenation in order to ensure the production of a high grade metal halide. In the preparation of zirconium tetrachloride by the chlorination of scrap zirconium, for example, it has been found that if all of the scrap zirconium is chlorinated the zirconium tetrachloride will contain amounts of metal impurities such as iron and tin chlorides equivalent to that found in the feed material. In other words, the metal impurities present in the scrap zirconium apparently undergo chlorination along with the zirconium and consequently will be found as impurities in the zirconium tetrachloride product. By following the teachings of this invention such contamination of the zirconium tetrachloride product will be avoided. Thus, if not more than about 90% of the scrap zirconium is chlorinated the zirconium tetrachloride product will contain considerably less metal impurities than originally present in the scrap.

The invention will be more fully understood by reference to the following specific examples, which illustrate certain particular features thereof.

EXAMPLE I

An inch and a half Vicor tube, three feet long, provided with a standard tapered fitting at one end and an exploring thermocouple and gas inlet at the other end, was used as the chlorinator. The tube was placed in an electrically wound furnace made of silica tubing. Scrap zirconium metal was pressed into very compact five inch bars having a cross section of about one inch. The Vicor tube was charged throughout its length with these bars. The total charge of zirconium scrap was 1571 grams. A flow of argon was sent through the tube while the furnace was brought to a temperature of about 450° C. Chlorination was started by introducing chlorine into the tube at a flow rate of 400 cc. per minute with the argon being maintained at a similar flow. The reaction zone was observed visually as a glowing area which moved slowly through the zirconium scrap bars. The temperature of this reaction zone was about 500° to 850° C., and the reaction zone was not allowed to proceed beyond 28 inches of the zirconium scrap bars, that is about 80% conversion. Chlorine consumption was 100 percent, since no evidence of unreacted chlorine was found in the exiting gases. When the reaction zone proceeded through 28 inches of zirconium scrap bars, chlorination was stopped. The zirconium tetrachloride reaction product, exiting from the tube as gases, was condensed in Stauffer condenser at the other end of the tube. The zirconium tetrachloride obtained was an almost white, free flowing, powder having the spectroscopic analysis set forth in column 3 below in Table 1.

Table 1[1]

| Metal | Low-Hafnium Zirconium Scrap Feed | ZrCl. Product | Ash in Tube |
|---|---|---|---|
| Al | 65 | 94 | 225. |
| Cd | <0.5 | 0.8 | <0.5. |
| Cr | 700 | 25 | 1,500–2,500 EST. |
| Fe | 970 | 140 | 0.32%. |
| Mn | 23 | <5 | 105. |
| Ni | 255 | <15 | 2,000 EST. |
| Pb | 85 | 20 | 300. |
| Sn | 1.6% | 188 | 0.24%. |
| Ti | <20 | <20 | 40. |
| V | <10 | <10 | <10. |
| W | <20 | <20 | 220 EST. |

[1] Values in this table are given in parts per million based on zirconium unless otherwise stated.

EXAMPLE II

A three inch Vicor tube, four feet long, provided with a thermocouple and gas inlet tubes, is charged with 600 grams of briquetted low hafnium zirconium turnings. A flow of argon of 800 cc. per minute is passed through the tube to sweep out the air and to maintain an inert atmosphere. The temperature of the furnace is maintained at about 600° C., chlorine introduced at rates of 125 to 300 cc. per minute. Chlorination began immediately at the site where the chlorine entered the system creating a two inch reaction zone having a temperature of about 700° C. In four hours about 50% of the charge is depleted. The zirconium tetrachloride product is a free flowing, snow white powder analyzing 84 p.p.m. hafnium, 52 p.p.m. iron, and 150 p.p.m. tin.

The above data show that dilution of input chlorine with argon gas tempered the chlorination sufficiently to make a safe, operable process for the conversion of zirconium scrap to zirconium tetrachloride. In addition, the above data show that by carrying out the chlorination in accordance with the present invention, the zirconium tetrachloride product has a lower metallic impurity content than the zirconium scrap feed material.

EXAMPLE III

Using the reactor of Example II, about 80% of a low hafnium zirconium scrap feed containing about 1.6% tin and about 970 p.p.m. iron was chlorinated with chlorine diluted with argon at a temperature of about 800° C. The zirconium tetrachloride product analyzed for only 53 p.p.m. tin and less than 20 p.p.m. iron.

EXAMPLE IV

Titanium scrap in the form of turnings were compacted into bars (5'x¼"x¼") washed with CCl₄, dried, and placed in a Vicor tube (3'x½") to a depth of twenty inches. This charged tube was placed in an electrically heated furnace, an argon atmosphere was established with a flow of 400 cc./min. and the exit end was attached to a pyrex receiver surmounted with a water cooled condenser. When the furnace reached a temperature of 450° C., chlorine gas, dried over $H_2SO_4$, was introduced at 400 cc./min. Chlorination began immediately, a hot reaction zone was established in a few minutes (750° C.) and a colorless distillate began to collect in the cold receiver. The progress of the reaction zone down the tube was followed with an exploring thermocouple, and when 16 inches of the 20 inch charged were consumed the chlorine flow was stopped and the reactor permitted to cool down.

Table 2

| Metal | Analysis of Titanium Scrap, percent | Analysis of TiCl₄, percent |
|---|---|---|
| Si | .098 | .008 |
| Fe | .23 | .01 |
| Al | [1] 250 | [1] 80 |
| Mn | 0.10 | .005 |
| V | .10 | .002 |
| Mg | .080 | .002 |
| C | .048 | .014 |

[1] P.p.m.

EXAMPLE V

Using the reactor of Example II, low hafnium zirconium scrap containing about 970 p.p.m. iron and 1.6% tin was completely chlorinated with chlorine diluted with an equal volume of argon at a temperature of about 800° C. The last 100 grams of product were collected separately and spectrographic analyses were made on the last fraction (100 g.) and the residue left in chlorination tube.

Table 3

| Metal | Last Fraction | Residue |
|---|---|---|
| Al | 100 | 325 |
| B | 1.5 | |
| Cd | <.5 | |
| Co | <.5 | |
| Cr | 60 | 2000 |
| Fe | 1.0% | 2.3% |
| Mg | 29 | 230 |
| Mn | 26 | 140 |
| Mo | <10 | <10 |
| Ni | 140 | 2000 |
| Pb | 800 | 200 |
| Si | 65 | >1,000 |
| Sn | 190 | 0.94% |
| Ti | <20 | 115 |
| V | <10 | <10 |
| W | 1.5 | 900 |

EXAMPLE VI

Using the experimental arrangement of Example II about 1000 grams of hafnium turnings were charged into the tube and chlorinated at 650° C. using a flow of 800 cc./min. argon and 300 cc./min. chlorine. In five hours about 75% of the charge was converted to hafnium tetrachloride, which was collected as a free flowing white powder showing the following comparative spectrographic analysis:

Table 4

| Metal | Hafnium Feed | HfCl₄ Product |
|---|---|---|
| Al | 350 | <45 |
| Cd | <5 | <5 |
| Co | 25 | <0.5 |
| Cr | 255 | <25 |
| Fe | 1,350 | <50 |
| Mg | 125 | <20 |
| Mn | 35 | <5 |
| Ni | 30 | <25 EST. |
| Pb | 30 | <5 |
| Si | 300 | 30 |
| Ti | 75 | <20 |

While particular embodiments of this invention are shown above, it will be understood that the invention is obviously subject to variance and modification without departing from its broader aspects. For example, the inert gas employed to dilute the halogen gas may be readily recovered and recycled through the reaction system. It will be understood, therefore, that other modifications and variations may be employed within the scope of the following claims.

What is claimed is:

1. A method for preparing purified metal halide from impure grade metal selected from the group consisting of metals of group IVB and group VB of the periodic table which comprises reacting said impure metal feed material with a halogen gas diluted with an explosive-preventing proportion of an inert gas selected from the group consisting of helium, argon and neon at a temperature of about 450° to 900° C., said reaction being carried out until from about 50 to 90% of said impure metal feed material has been reacted, and recovering said purified metal halide.

2. The method of claim 1 wherein the halogen gas is chlorine.

3. The method of claim 1 wherein the inert gas is argon.

4. The method of claim 1 wherein said metal halide is zirconium halide.

5. The method of claim 1 wherein said metal halide is titanium halide.

6. The method of claim 1 wherein said metal halide is hafnium halide.

7. A method for preparing purified zirconium tetrahalide which comprises reacting zirconium scrap with a halogen gas diluted with an explosive-preventing proportion of an inert gas selected from the group consisting of helium, argon and neon at a temperature of about 450° to 900° C., continuing said reaction until from about 50 to 80% of the zirconium scrap has been reacted, and recovering said purified zirconium tetrahalide.

8. A method for preparing purified zirconium tetrachloride which comprises reacting zirconium scrap containing iron and tin metal impurities with chlorine diluted with argon gas at a temperature of about 450° to 900° C., continuing said reaction until from about 50 to 80% of the zirconium scrap has undergone reaction, and recovering zirconium tetrachloride having a lower iron and tin content than the zirconium scrap.

9. The method of claim 8 wherein the argon to chlorine feed volume ratio is about 2:1 to 10:1.

References Cited in the file of this patent

UNITED STATES PATENTS

| | | |
|---|---|---|
| 2,020,431 | Osborne et al. | Nov. 12, 1935 |
| 2,184,887 | Muskat et al. | Dec. 26, 1939 |
| 2,680,670 | Smith | June 8, 1954 |

FOREIGN PATENTS

| | | |
|---|---|---|
| 689,012 | Great Britain | Mar. 18, 1953 |
| 936,804 | Germany | Dec. 22, 1955 |